United States Patent
Gavard et al.

(10) Patent No.: US 6,857,190 B2
(45) Date of Patent: Feb. 22, 2005

(54) METHOD OF FORMING A RETAINING COLLAR, IN PARTICULAR, A COLLAR RETAINING A BEARING ON A HUB OF A WHEEL

(75) Inventors: Cedric Gavard, Annecy (FR); Andre Odelin, Annecy (FR)

(73) Assignee: S.N.R. Roulements, Annecy Cedex (FR)

( * ) Notice: Subject to any disclaimer, the term of this patent is extended or adjusted under 35 U.S.C. 154(b) by 0 days.

(21) Appl. No.: 10/380,252

(22) PCT Filed: Jul. 25, 2001

(86) PCT No.: PCT/EP01/08621

§ 371 (c)(1),
(2), (4) Date: Mar. 12, 2003

(87) PCT Pub. No.: WO03/006263

PCT Pub. Date: Jan. 23, 2003

(65) Prior Publication Data

US 2003/0177641 A1 Sep. 25, 2003

(30) Foreign Application Priority Data

Jul. 13, 2001  (FR) .......................................... 01 09420

(51) Int. Cl.$^7$ .............................. B21D 53/10; B21K 1/40
(52) U.S. Cl. .............................. 29/898.062; 29/898.061; 29/898.07; 29/894.36; 29/894.361; 29/894.362
(58) Field of Search ....................... 29/894.36, 894.361, 29/894.362, 898.062, 898.061, 898.07, 898.09, 507, 522.1, 523, 725; 301/105.1; 384/543, 544, 537

(56) References Cited

U.S. PATENT DOCUMENTS

| 4,893,960 A | * | 1/1990 | Beier et al. |
| 5,226,738 A | * | 7/1993 | Valette et al. |
| 6,398,419 B1 | * | 6/2002 | Kashiwagi et al. |
| 6,478,471 B2 | * | 11/2002 | Ishida et al. |
| 6,553,666 B2 | * | 4/2003 | Miyazaki |
| 2002/0172439 A1 | * | 11/2002 | Webb et al. |

FOREIGN PATENT DOCUMENTS

| EP | 0992698 | * | 4/2000 |
| EP | 1079125 | * | 2/2001 |
| EP | 1110756 | * | 6/2001 |

* cited by examiner

*Primary Examiner*—Eric Compton
(74) *Attorney, Agent, or Firm*—Myron Greenspan, Esq.; Lackenbach Siegel, LLP

(57) ABSTRACT

A method is disclosed for forming an annular collar (11) that is essentially radial on the hollow annular end portion (12) of a port (7). This method has the following steps: A. radially deforming the end portion (12) by means of a first tool (16), in which the axis (18) of the tool (16) and the axis (5) of the end portion (12) form a non-zero angle α between them to obtain an essentially radial collar preform (17); and B. deforming this preform (17) by means of a second tool (23) to obtain a final shaping of the collar (11) by pressing. This invention also relates to a method of retaining a bearing (1) on a shaft (7), and to the assembly that comprises this shaft (7) and bearing (1).

11 Claims, 7 Drawing Sheets

METHOD OF FORMING A RETAINING COLLAR, IN PARTICULAR, A COLLAR RETAINING A BEARING ON A HUB OF A WHEEL

CROSS-REFERENCE TO RELATED APPLICATIONS

This application is a National Phase Application of PCT International Application No. PCT/EP01/08261, which claims priority of French Patent Application No. 01/09420 filed on Jul. 13, 2001.

BACKGROUND OF THE INVENTION

1. Field of the Invention

The present invention relates to a method of form an annular collar that essentially radial on a hollow annular end portion of a part, and to a method of retaining a bearing on the outside surface of a shaft, and to an assembly comprising a shaft and a bearing.

2. Description of the Related Art

The invention is typically applicable for retaining a bearing on a hub or a stub of a wheel of a motor vehicle, so as to enable it to be rotated.

To achieve such retention, it is known that a nut-and-bolt system can be used which, by applying a tightening force between the hub and the inner ring of the bearing, makes it possible firstly to retain the bearing and secondly to adjust the applied pre-load.

Such systems suffer, in particular, from the drawback of requiring a step of adjusting the pre-load during assembly. In addition, due to the nut loosening, they are liable not to provide a constant pre-load throughout the life span of the bearing.

To solve those drawbacks, "ready-to-use" bearings have been proposed that, by manufacture, are held stationary on the outside surface of the hub, thereby providing the pre-load without subsequent adjustment being necessary. Such retention is obtained, in particular, after disposing the bearing on the hub, by forming a radial collar on the free end of the hub.

To form such a collar, it is known that it is possible to use a method in one deformation step during which a tool having the overall shape of the collar to be formed is put in rotating contact with the free end of the hub or of the stub.

Such methods suffer, in particular, from the drawback of requiring large forces to be applied to the free end so as to push back the material forming the collar.

Unfortunately, for forming collars of size sufficient to withstand the operating stresses, it is frequent for the forces applied to damage the bearings.

In particular, residual stresses at the raceways can appear because of the rings swelling due to the forces applied. Such stresses give rise to a reduction in the life span of the bearings by them flaking or breaking prematurely.

In addition, with methods in a single deformation step, it is difficult to apply a retaining tension that is sufficient between the bearing and the outside surface of the hub, i.e. to press the inner ring against the outside surface of the hub or of the stub.

Finally, forming a substantially plane face on the free lateral face of the collar, although necessary to guarantee correct abutment against another part, is difficult to obtain with the prior art methods in one deformation step.

SUMMARY OF THE INVENTION

An object of the invention is thus to remedy those drawbacks by providing a method of forming a collar that subjects the bearing to lower forces, while enabling the collar to be formed of modular geometrical shape, as a function of the specific use of the assembly including the bearing.

To this end, and in a first aspect, the invention provides a method of forming an annular collar that is essentially radial on the hollow annular end portion of a part, said method comprising the following steps:

radially deforming the end portion by means of a first tool, the axis of the tool and the axis of the end portion forming a non-zero angle α between them, the tool and the end portion being moved relative to each other firstly in rotation about the axis of the end portion and secondly linearly along the axis of the end portion, so as to obtain a collar preform that is essentially radial; and deforming said preform by means of a second tool, said tool and said preform being moved relative to each other linearly along the axis of the preform so as to obtain final shaping of the collar by pressing.

In a second aspect, the invention provides a method of retaining a bearing on the outside surface of a shaft, said bearing comprising at least one inner ring provided with an annular bore, an outer ring and rolling bodies disposed between said rings, said shaft having an outside diameter that is substantially equal to the diameter of the bore, and at least one hollow annular axial projection, said method comprising the following steps:

disposing the shaft coaxially in the bore in the inner ring so that at least an and portion of the projection is disposed outside the bore; and forming a collar on the projection by implementing the above-described method, said collar extending radially outwards while abutting against at least a portion of the lateral face of the inner ring, said collar forming retaining means for retain the inner ring of the bearing.

In a third aspect, the invention provides an assembly comprising a bearing and a shaft, said bearing being retained or held stationary on said shaft by implementing the above-described method.

BRIEF DESCRIPTION OF THE FIGURES

Other objects and advantages of the invention appear from the following description given with reference to the accompanying drawings, in which.

DETAILED DESCRIPTION OF THE PREFERRED EMBODIMENTS

Figure 1:
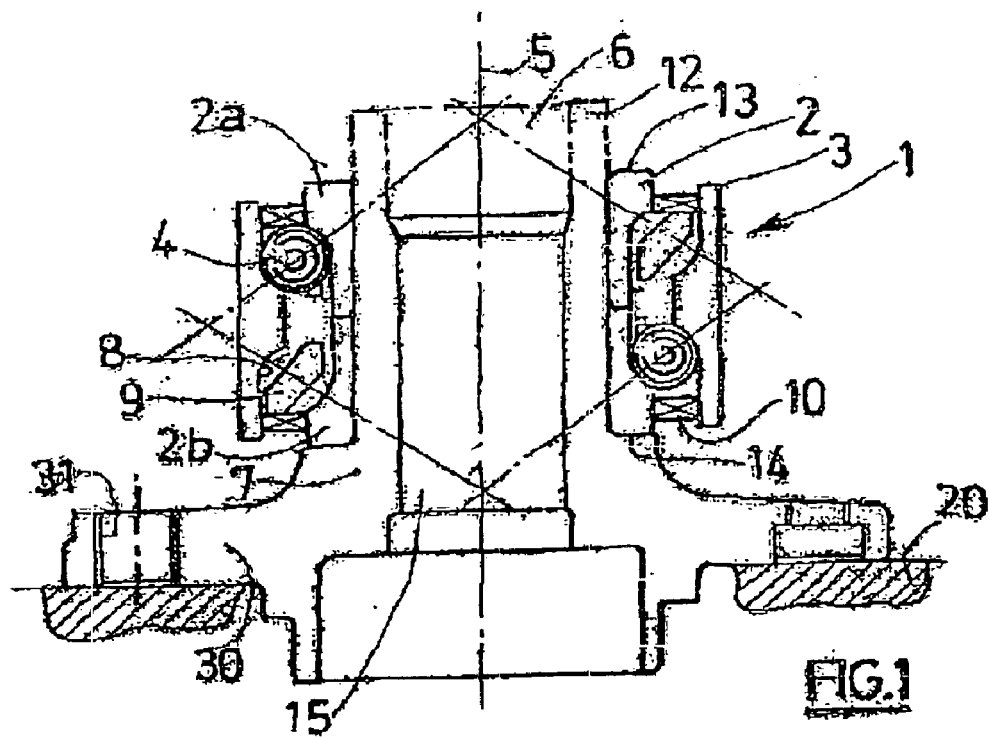
FIG. 1 is a longitudinal section view of an assembly comprising a bearing engaged over the outside surface of a wheel hub in interfitting manner, before the collar forming means for retaining said bearing is formed.

FIGS. 1 to 10 show an assembly comprising a bearing 1 provided with an inner ring 2, with an outer ring 3, an with rolling bodies 4 mutually disposed so as to enable the two rings 2, 3 to rotate relative to each other about an axis 5.

In the description, the terms "outer" and "inner" are defined relative to planes that are respectively distant from and close to the axis 5, the terms "axial" or "transverse" are defined relative to a plane parallel to the axis 5, and the terms "radial" or "lateral" are defined relative to a plane perpendicular to the axis 5.

In the embodiments shown, the outer ring 3 is a fixed ring and the inner ring 1 is a rotary ring, but, depending on needs, the inverse configuration may also be considered.

Each of the inner and the outer rings 2 and 3 is formed of a respective annular ring in which a bore is formed, the bore 6 in the inner ring 2 being organized to enable a shaft 7 to be disposed inside it, and the bore in the outer ring 3 being organized to receive the inner ring 2 and thee rolling bodies 4.

In addition, the rolling ways or "raceways" 8 are formed facing one another respectively on the outside face of the inner ring 2 and on the inside face of the outer ring 3.

In the embodiments shown, the rolling of the bearing is provided by two rows of balls 4 held equidistant from each other by a cage 9, and the inner ring 2 is made up of two portions 2a and 2b in mutually abutting alignment (FIGS. 1 to 8). In a variant shown in FIGS. 9 and 10, a raceway is provided respectively on an inner ring 2 and directly on the outside surface of the shaft 7.

These types of bearing are particularly well suited for rotating a hub 7 or a stub of a wheel of a motor vehicle. However, other known types of bearing may be used, depending on the needs of the application in question.

In addition, the bearing 1 used may, in known manner, be provided with sealing means 10 and/or with a sensor device for sensing information such as speed of rotation, direction of movement, and/or angular position of the rotary ring relative to the fixed ring.

The bearing 1 serves to enable a shaft 7 to be rotate relative to a fixed structure. In the embodiments shown, the shaft is a hub 7 of wheel of a motor vehicle, and the fixed structure is the chassis of the vehicle.

To this end, the bearing 1 is disposed, for example, by engaging the hub 7 in the bore 9 in the inner ring 2, over the outside surface of the hub 7 in interfitting manner.

As part of its function, the bearing 1 must be retained so that it is firmly prevented from rotating and from moving in translation relative to the hub 7. For this purpose, and in view of the forces exerted in this application, the interfitting engagement force is not sufficient to provide sufficient retention.

That is why a radial collar 11 is formed on an end portion 12 of the hub 7, said collar 11 coming into abutment against at least a portion of the lateral face 13 of the inner ring 1 so as to apply a retaining force that is essentially axial on the bearing 1.

The steps of the method of forming such a collar 11 by cold plastic deformation are described below with reference to FIGS. 1 to 4.

In a first step, the bearing 1 is disposed coaxially e.g. by engaging the hub 7 in the bore 6 in the inner ring 2 in interfitting manner, over the outside surface of the hub 7. To this ends the outside diameter of the hub 7 and the diameter of the bore 6 are organized to be substantially equal. In a variant, and to procure a larger clamping force, the diameter of the bore 6 may be slightly smaller than the outside diameter of the hub 7.

The hub 7 has a radial annular surface 14 on which the inner ring 2 is caused to bear in order to lock the bearing 1 axially in the interfitting engagement direction.

The surface 14 is disposed on the outside face of the hub 7 at a distance such that, once the bearing 1 is put in contact with the surface 14, a portion of the hub 7 projects beyond the inner ring 2 axially.

The hub 7 is further provided with an axial bore 15 which, for the portion projecting beyond the inner ring 2, forms the hollow annular axial projection 12 which is to form the collar 11.

Figure 2:
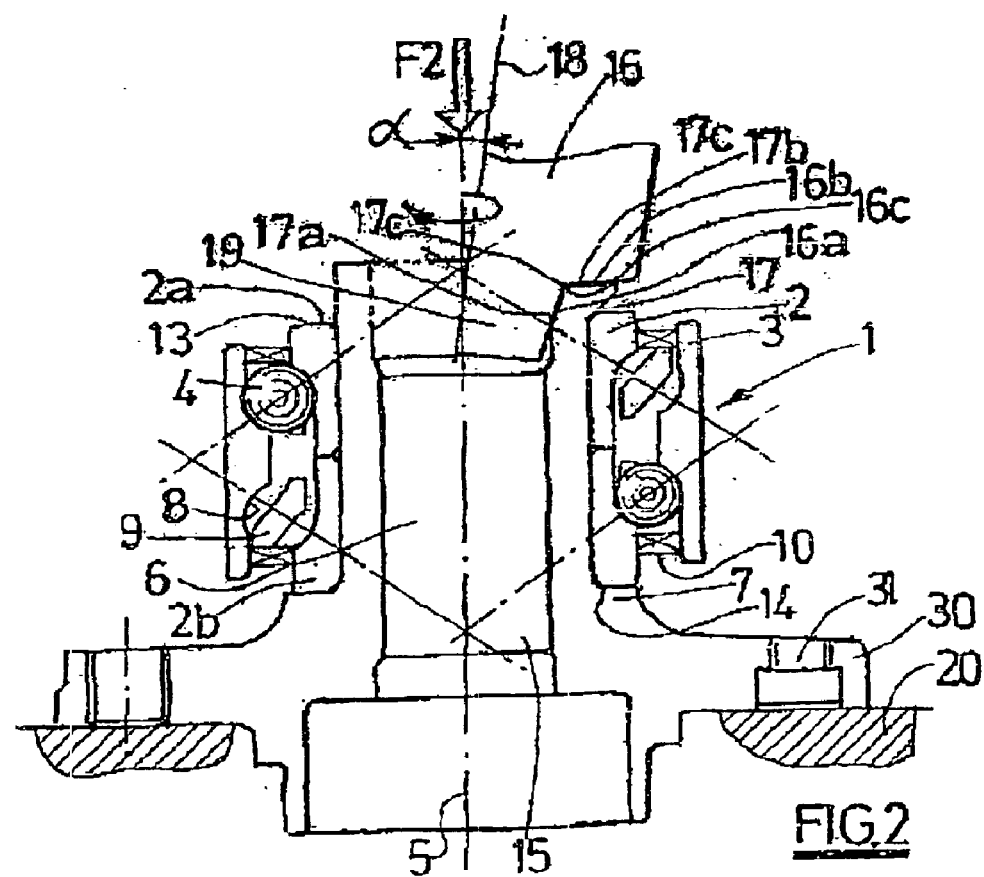
FIG. 2 is a diagrammatic longitudinal section view showing the step of deforming the end portion of the hub of the assembly shown in FIG. 1, so as to form a retaining collar preform.

FIG. 2 shows the second step of the method, during which the projection 12 is deformed radially by means of a first tool 16 so as to obtain a collar preform 17.

Figure 11:
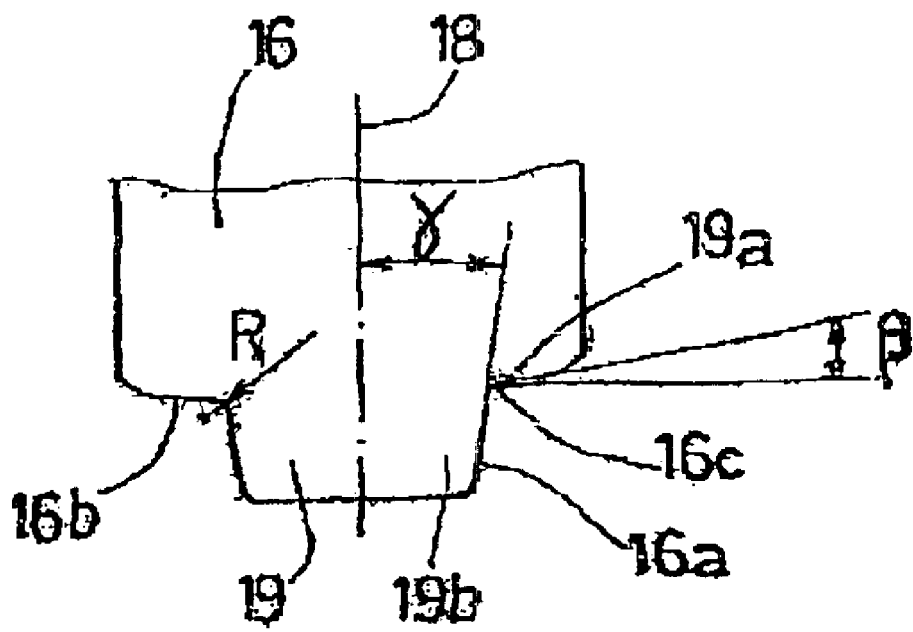
FIG. 11 is a diagrammatic fragmentary longitudinal section view of a first tool for implementing the method of the invention.

The first tool 16, which is shown in part in FIG. 11, has an axis of revolution 18 and a contact projection 19 made up of two frustoconical portions 19a and 19b which are mutually superposed along the axis of the tool 18 while tapering in the direction of the projection 19.

The first tool 16 thus has three contact surfaces, namely a transverse surface of revolution 16a sloping at an angle $\gamma$ relative to the axis 18, a lateral surface of revolution 16b sloping at an angle $\beta$ relative to the perpendicular to the axis 18, and a transition 16c of radius R between the two surfaces 16a, 16b.

During the deformation step, the tool 16 is disposed so that its axis 18 forms a non-zero angle $\alpha$ with the axis 5, an then the tool 16 is moved firstly linearly along the axis 5 in order to come into local contact with the projection 12 by applying an effort F2, and secondly in rotation about the axis 5 so as to deform all of the periphery of the projection 12.

In a particular example, the angle $\alpha$ lies in the range 0° to 20°. In addition, the first tool 16 may be made so that the angle $\gamma$ is not less than the angle $\alpha$, and so that the angle $\beta$ is equal to the angle $\alpha$.

To make the deformation possible, the assembly made up of the bearing 1 and of the hub 7 is held axially in the direction of application of the force F2, e.g. by an abutment 20 provided opposite from the projection 12.

In another implementation, the first tool 16 may remain fixed and the hub 7 may be moved in the two ways described above.

In a variant, the first tool 16 may also be rotated about its axis 18. For this purpose, either the tool 16 is left free to rotate, and the deformation contact causes it to rotate, or else the rotation is motor-driven.

In both cases, the rotation makes it possible to reduce the stresses induced during the deformation by reducing the resulting friction.

By causing the first tool 16 to move down gradually over the projection 12, this first deformation step, which may be referred to as "orbital riveting", makes it possible to form a collar preform 17 that is essentially radial. As shown in FIG. 2, the preform 17 comprises an axial portion 17a, a radial portion 17b, and an intermediate portion 17c which interconnects the two other portions 17a and 17b.

In particular, during this step, the transverse surface 16a of the first tool 16 makes it possible to help to fold the projection 12 by guiding the material outwards (material creep).

Via its intermediate portion 17c, the preform 17 exerts an axial retaining force on the bearing 1. However, the outermost radial portion of the collar 11 is not yet shaped, and the abutting of the preform 17 on the lateral face 13 of the inner ring 2 is only partial or even nonexistent.

Figure 3:
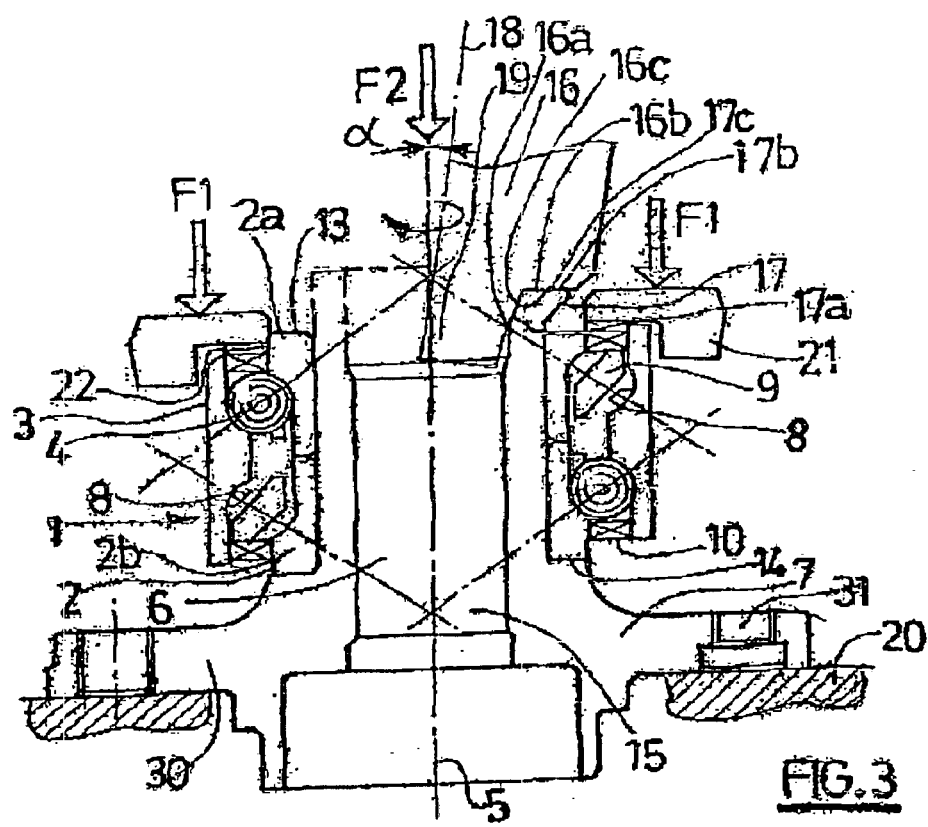
FIG. 3 is a diagrammatic longitudinal section view over variant of the step shown in FIG. 2.

In a variant shown in FIG. 3, an axial force F1 may be applied to the bearing 1 in particular in order to limit the stresses applied to the rings 2, 3 during the deformation. For example, the force may be applied by means of a holder 21 put in abutment against the axial face 22 of the inner ring 3.

Figure 4:
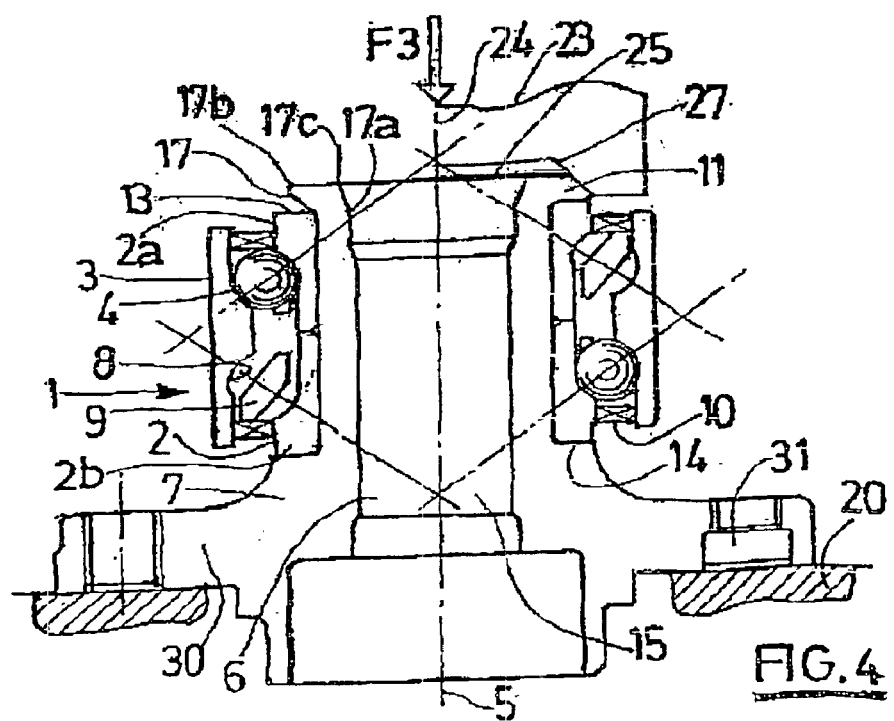
FIG. 4 is a diagrammatic longitudinal section view showing the step of deforming the collar preform obtained by implementing the step shown in FIG. 2, so as to form a retaining collar.

The method of the invention includes a second deformation step shown in FIG. 4, a during which the preform 17 is deformed by means of a second tool 23 for forming the retaining collar 11.

Figure 12:
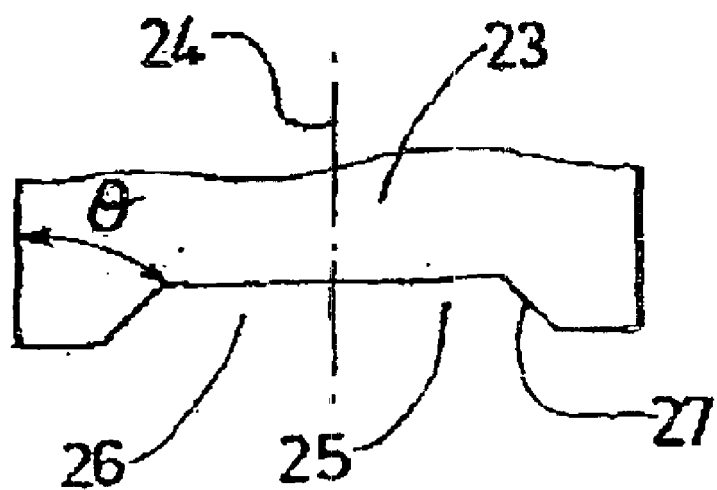
FIG. 12 is a diagrammatic fragmentary longitudinal section view of a second tool for implementing the method of the invention.

The second tool 23 is shown in part in FIG. 12, and it has an axis of revolution 24 and a contact recess 25 that is coaxially frustoconical in overall shape and that flares towards the opening 26 of the recess 25.

The second tool 23 thus has a contact surface 27, namely A transverse surface 27 that slopes at an angle $\theta$ relative to the axis 24. In a particular example, the angle $\theta$ lies in the range 30° to 60°.

During the deformation step, the tool 23 is moved linearly along the axis 5 so as to came into contact with the preform 17 while applying a force F3 over substantially 360° of said preform.

In another embodiment, the second tool 23 may remain fixed and the hub 7 may be moved linearly as mentioned above.

In a variant, the second tool 23 may further be moved in rotation about its axis 24. For this purpose, either the tool 23 is left free to rotate and the deformation contact causes it to rotate, or the rotation is motor-driven.

In both cases, the rotation makes it possible to improve forming of the collar 11, in particular by limiting errors out of roundness.

By causing the second tool 23 to move down over the preform 17, this second deformation step makes it possible to form the essentially radial collar 11 by pressing.

As shown in FIG. 4, the collar 11 comprises an axial portion 11a, a radial portion 11b, and an intermediate portion 11c which interconnects the other two portions 11a, 11b. During this step the axial portion 17a and the intermediate portion 17c of the preform 17 are substantially not deformed, and they are thus substantially identical to those of the collar 11. In contrast, the radial portion 17b is subjected to the pressing force so as to he shaped. For this purpose, the diameter of the opening 26 is substantially equal to the outside diameter of the collar 11.

In addition, the pressing force causes the preform 17 to fold over onto the lateral face of the inner ring, thereby making it possible to form a collar 11 that provides a considerable retaining function for retaining it against the hub 7.

In a variant, during either or both of the deformation steps, the outer ring 3 may be caused to rotate so as to increase the load capacity of the bearing 1 and thus to reduce the probability of damaging the raceways during these steps.

Implementing the method of the invention this makes it possible, in two deformation steps, to obtain a collar 11 that retains the bearing 1 reliably on the hub 7.

In addition, since it is performed in two steps, this implementation induces forces on the bearing 1 that are lower than in the prior art methods performed in one step, in which a tool having the overall shape of the collar 11 is used.

In the method of the invention, the first step mainly concerns deforming the projection 12, and the second step mainly concerns deploying the preform 17 over the lateral face 13 of the inner ring 2 and shaping its outermost radial portion.

Since the first step is implemented with a tool 16 that has a contact surface 16a–16c that is only partially analogous to the overall shape of the collar 11, and by offsetting the axis 18 of the tool 16 relative to the axis of the hub 7, a lower force is induced on the bearing 1 than in the prior art methods having a single deformation step.

Furthermore, when the contact between the first tool 16 and the projection 12 is local, the material pushed back during the deformation is not held captive by said tool, thereby avoiding generating additional stresses in the collar 11.

And, in the second step since the pressing forces are essentially localized on the outermost radial portion of the preform 17, they make it possible to deform the material without over-stressing the bearing 1.

In addition, an implementation in two steps makes it possible to offer greater flexibility in implementing the method.

Finally, the same first tool 16 may be used to form collars 11 for retaining bearings 1 of different sizes.

FIGS. 5 to 10 show six embodiments of an assembly comprising a bearing 1 held stationary on a hub 7 of a wheel by means of a collar 11 obtained by implementing the above-described method.

Figure 5:
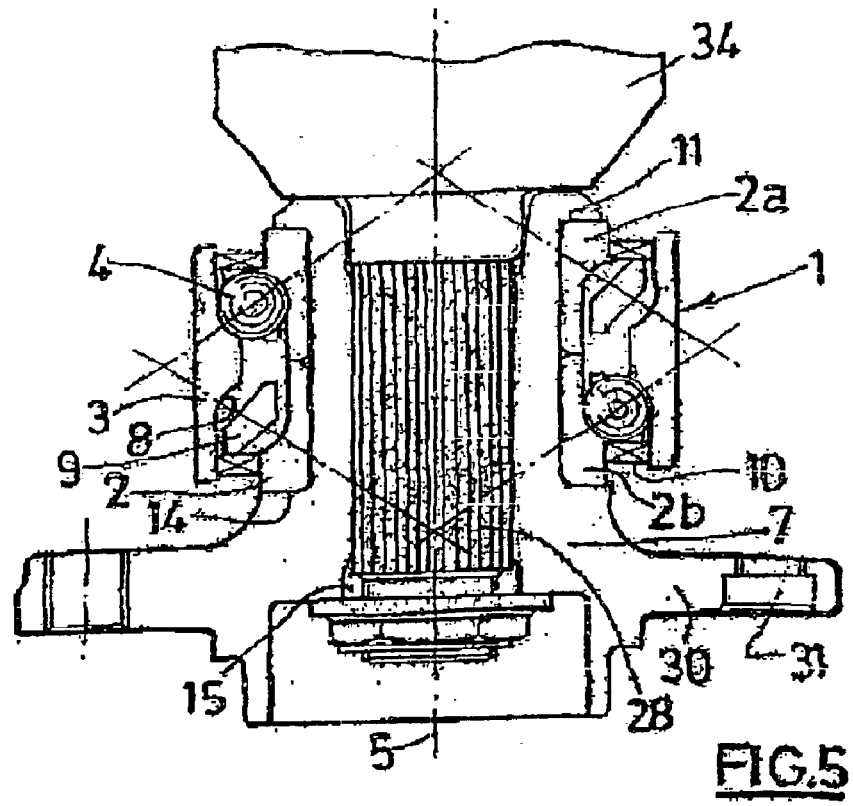
FIGS. 5 to 10 are longitudinal section views respectively showing six embodiments of an assembly comprising a bearing held stationary on a wheel hub by means of a collar obtained by implementing the method of the invention.
Figure 6:
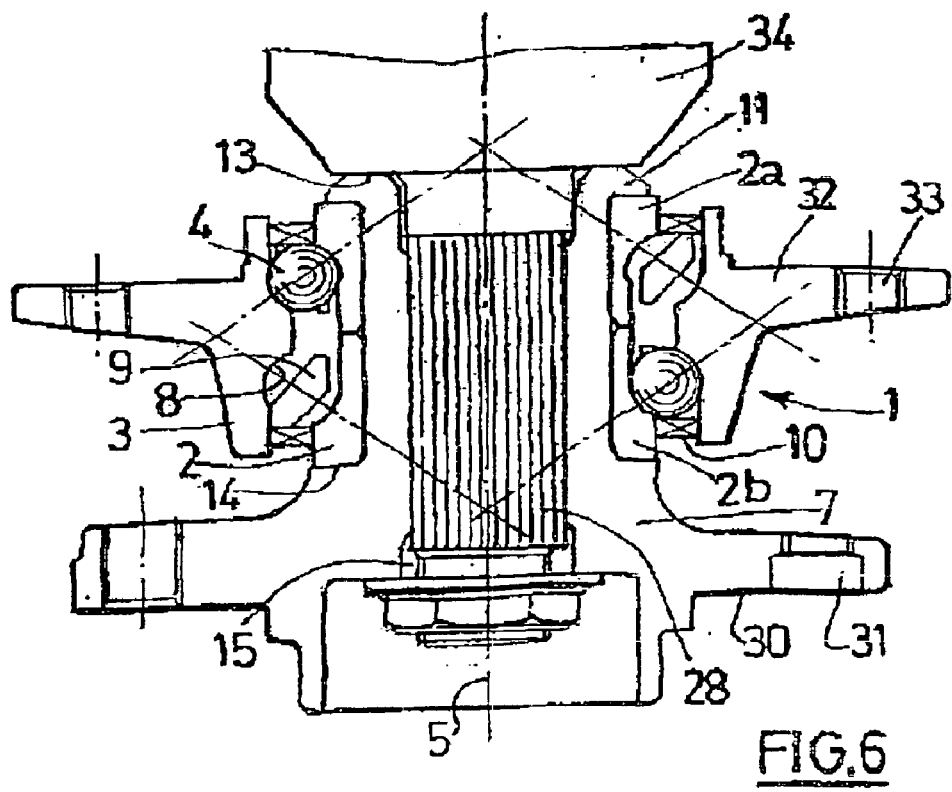
Figure 9:
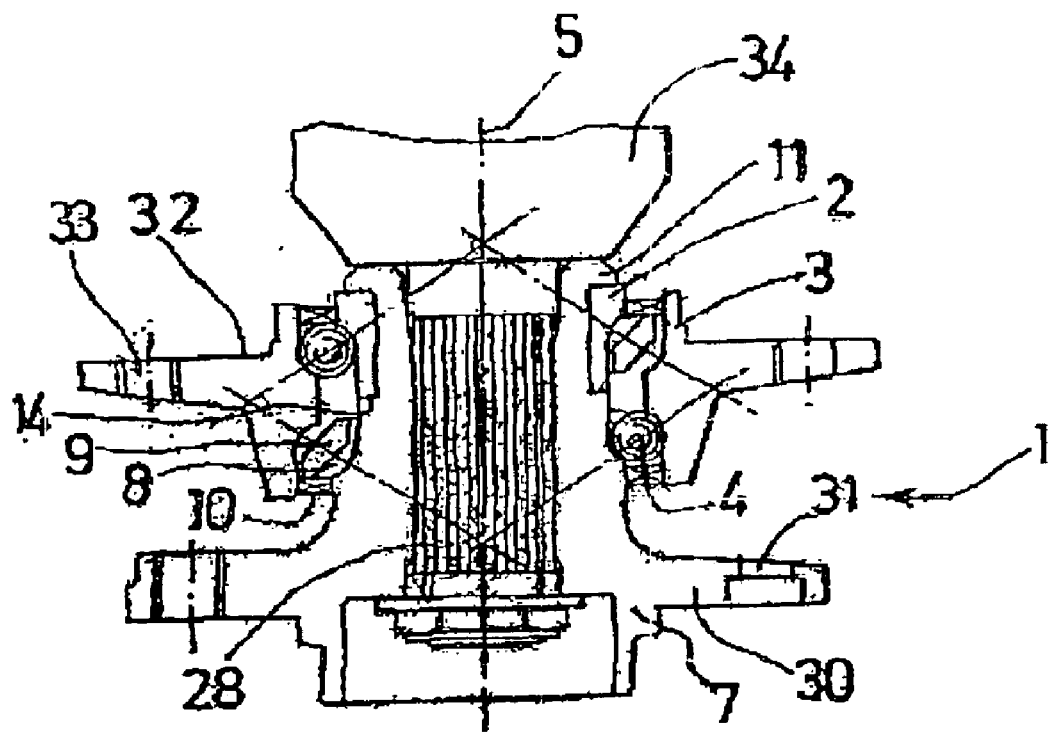

FIGS. 5, 6, and 9 show embodiments in which the hub 7 is the hub of a drive wheel of a motor vehicle.

To this end, the hub 7 is provided with a bore 15 in which a drive shaft 28 is disposed so as to be associated with it by screwing.

Figure 7:
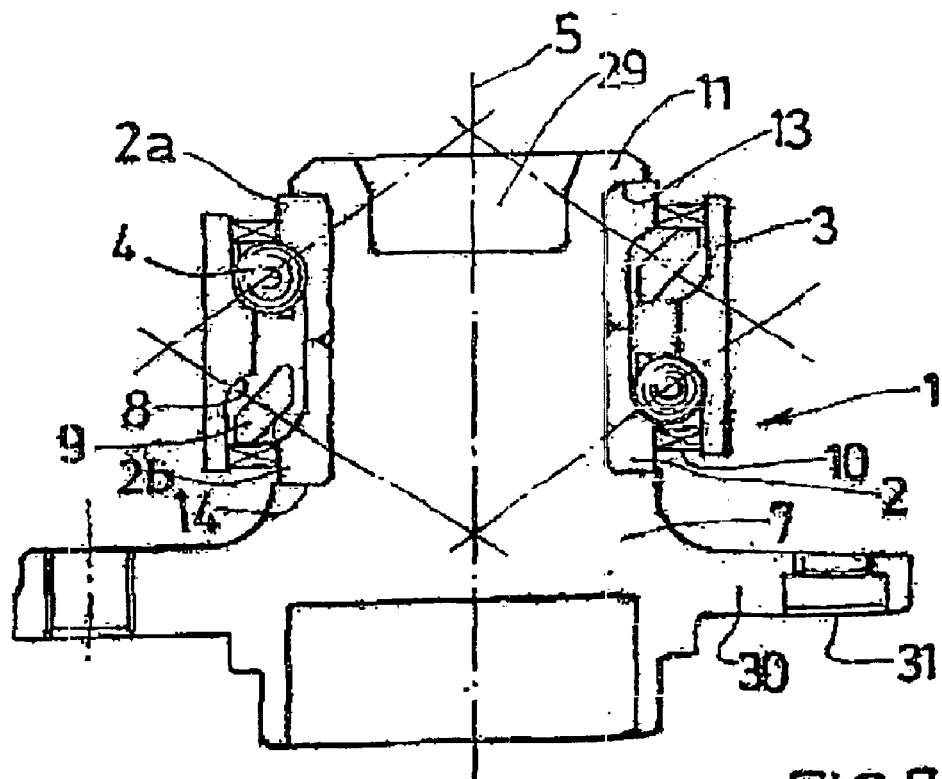
Figure 8:
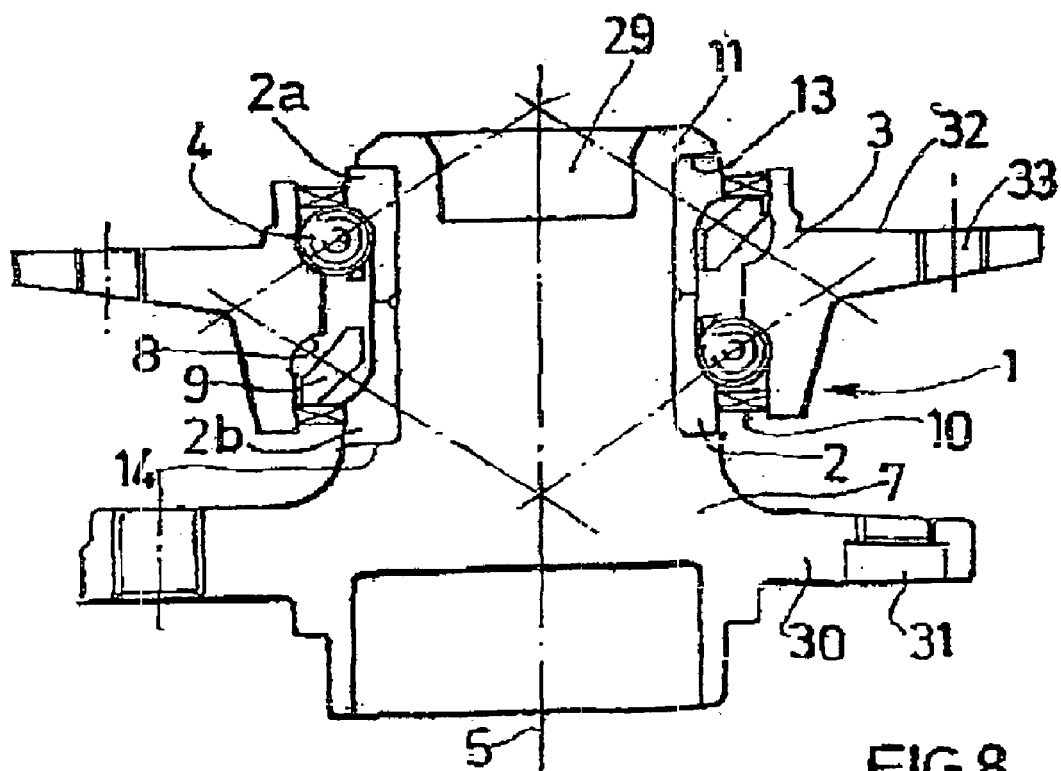
Figure 10:
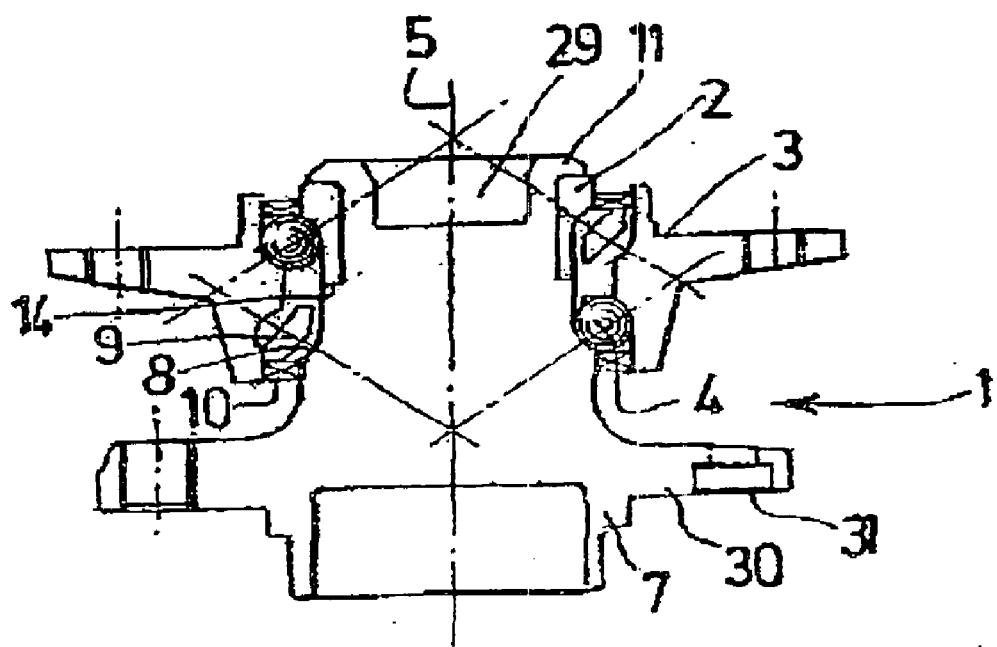

FIGS. 7, 8, and 10 show embodiments in which the hub 7 is the hub of a non-drive wheel of a motor vehicle.

To this end, the hub 7 is solid and has a hollow annular recess 29 forming the end portion 12 on which the collar 11 is formed.

In FIGS. 5 and 7, opposite from the collar 11, the hub has a fixing flange 30 for fixing the assembly on a rotary structure, e.g. formed by a wheel rim. To this end, the flange 30 is provided with fixing holes 31 organized to enable the association to take place by bolting.

In FIGS. 6 and 8 to 10, the bearing 1 further comprises an outer ring 3 provided with a fixing flange 32 for fixing the assembly to a fixed structure, e.g. formed by the chassis of the vehicle. To this end, the flange 32 is provided with fixing holes 33 organized to enable the association to take place by bolting.

Although the description is given with reference to a hub of a wheel of a motor vehicle, the invention is also applicable to any assembly in which, to cause a shaft 7 to rotate relative to a fixed structure, it is necessary to retain the bearing 1 on the outside surface of said shaft 7.

Figure 13:
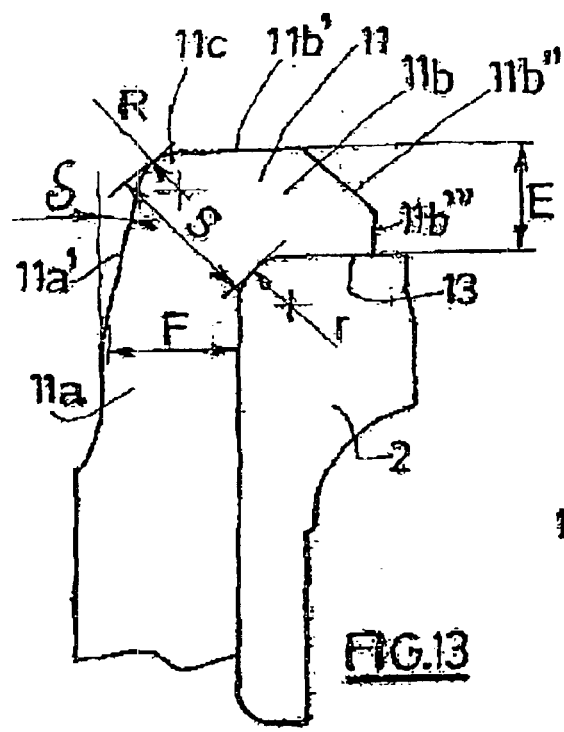
FIGS. 13 and 14 are longitudinal section views showing respective ones of two collar shapes obtained by implementing the method of the invention using the tools shown in FIGS. 11 and 12.
Figure 14:
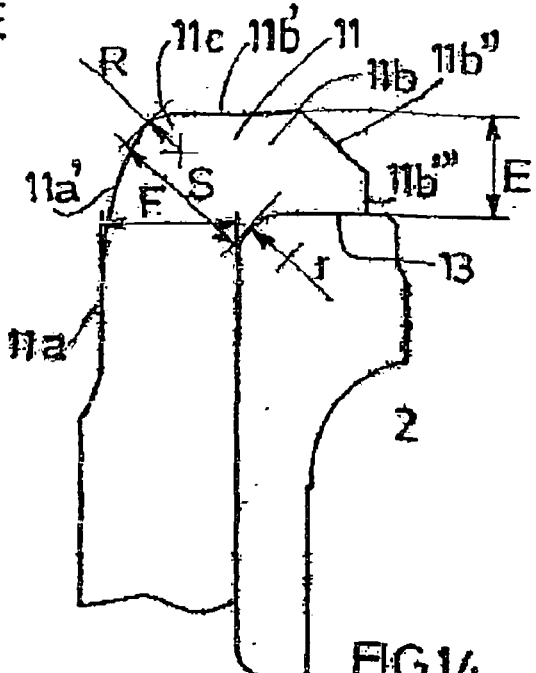
Figure 15:
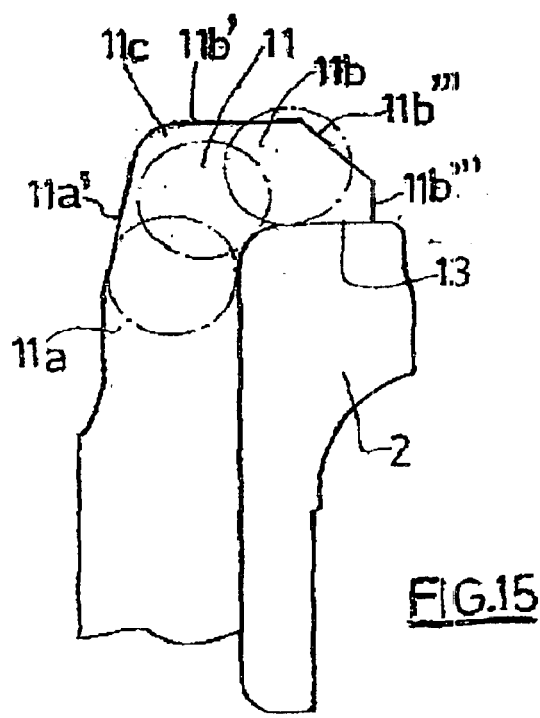
FIG. 15 shows the differences in thickness of the axial, radial.

Two collar shapes are described below with reference to FIGS. 13 to 15, for collars 11 obtained by implementing the method of the invention by using the tools 16, 23 shown in FIGS. 11 and 12.

Each of the collars 11 shown has an axial portion 11a of thickness F, a radial portion 11b extending outwards and of thickness E, and an intermediate portion 11c of thickness S which interconnects the other two portions, S being taken to be the maximum thickness of the intermediate portion 11c of the collar 11.

As described above with reference to the method, the projection 12 is folded ever essentially by means of the first tool 16.

In particular, the free annular transverse surface 11a' of the axial portion 11a is formed by the transverse surface 16a of the first tool 16 so as to be substantially plane and sloping at an angle δ relative to the axis 5.

Ideally this gives the relationship δ≈α÷γ, so that it is very easy to adjust the angle δ as a function of needs, either by varying the angle of inclination α of the first tool 16, or by modifying the angle γ of the first tool 16.

In a variant (FIG. 14), and in particular when the force applied during the second step is large, the surface 11a' can become rounded by material returning, thereby forming a curved surface.

In addition, and still essentially during the first deformation step, the free annular lateral surface 11b' of the radial portion 11b is formed by the lateral surface 16b of the tool 16.

Thus, the surface 11b' is substantially plane and slopes at an angle β-α relative to the perpendicular to the axis 5.

In the embodiment shown in the figures, the angle β is equal to the angle α so that the surface 11b' is perpendicular to the axis 5. This embodiment is particularly well suited to the case when a drive assembly (FIGS. 5, 6, or 9) or a transmission bowl 34 is to be put in abutment against said surface 11b'.

In a variant, the collar 11 may have an intermediate portion 11c whose inside radius r is greater than its outside radius R. Thus, it is possible to obtain a radius R that is small, i.e. a surface 11b' offset towards the axis 5 and thus remote form a lateral plane containing the inner ring 2. When, for example, a transmission bowl 34 is put in abutment against the surface 11b', the offset can be advantageous in that the effort applied by the bowl 34 against the assembly tends to put the hub 7 under more stress and the bearing 1 under less stress.

Another remarkable characteristic of the collar 11 is that it has an axial portion 11a, a radial portion 11b, and an intermediate portion 11c that are of different thicknesses. In particular, as shown in FIG. 13 with circles of constant diameter, the relationship E<F<S is obtained that is recognized as being desirable for achieving good retention.

In a particular example, the thickness F may lie in the range 4 mm to 8 mm.

During the second deformation step, the end portion of the radial portion 11b is shaped to have firstly a free surface 11b'' that slopes at an angle θ relative to the perpendicular to the axis 5, and secondly a free surface 11b''' that is substantially in alignment with the axis 5. This embodiment also makes it possible to improve the retention obtained by means of the by guaranteeing good contact between the collar 11 and the lateral face 13 of the inner ring 2.

Among the advantages of the method of the invention, the following may be mentioned in particular:

the expansion stresses in the inner ring 2 are reduced because a pressing step is used;

circularity errors on the inner ring 2 (in particular out of roundness of the raceway) generated by the orbital riveting operation with local contact are eliminated because of the 360° contact of the pressing tool;

the hub 7 is subjected to additional tensioning due to the inward forces exerted towards the inside of the bearing 1 during the pressing step because of the contact surface 27 sloping at an angle θ of the second tool 23; this is favorable to the retaining force and thus to the reliability of the assembly;

the tool 16 necessary for the orbital riveting operation is simplified because its contact surface 16a–16c does not have the overall shape of the collar 11;

it is possible to omit the force applied via the holder 21;

it is possible to use the same first tool 16 for several different collars 11 because the contact surface 16a–16c of the first tool 16 is only partially in the overall shape of the collar 11; and the risks of infiltration between the collar 11 and the lateral face 13 of the inner ring 2 are reduced because of the improved contact that is obtained between them.

What is claimed is:

1. A method of forming an annular collar (11) that is essentially radial on a hollow annular end portion (12) of a part (7), said method comprising the following steps:

radially deforming the end portion (12) by means of a first tool (16), the first tool (16) being in local contact with said end portion (12), the axis (18) of the tool (16) and the axis (5) of the end portion (12) forming a non-zero angle α between them, the first tool (16) comprising a contact projection (19) formed in two frustoconical portions (19a, 19b) which are mutually superimposed along the axis (18) of the tool (16) while tapering in the direction of the projection (19), so as to have a transverse surface of revolution (16a) that slopes at an angle γ relative to the axis (18) of the tool (16), a lateral surface of revolution (16b) that slopes at an angle β relative to the perpendicular to the axis (18) of the tool (16), the angle β being substantially equal to the angle α, and an interconnection transition (16c) between the two surfaces, the tool (16) and the end portion (12) being moved relative to each other first in rotation about the axis (5) of the end portion (12) and, second, linearly along the axis (5) of the end portion (12), so as to obtain a collar preform (17) that is essentially radial; and deforming said preform (17) by means of a second tool (23), said second tool (23) and said preform (17) being moved relative to each other linearly along the axis (5) of the preform (17) so as to obtain final shaping of the collar (11) by pressing.

2. A method according to claim 1, characterized in that the first tool (16) is further moved in rotation about its own axis (18).

3. A method according to claim 1, characterized in that the angle γ is not less than the angle α.

4. A method according to claim 1, characterized in that the second tool (23) is further moved in rotation about its own axis (24).

5. A method according to claim 1, characterized in that the second tool (23) is in contact with the preform over substantially 360°.

6. A method according to claim 5, characterized in that the second tool (23) has a contact recess (25) that is coaxially frustoconical in overall shape while flaring toward the opening surface (27) that slopes at an angle θ relative to the axis (24), and in which the inside diameter of the opening (26) is substantially equal to the outside diameter of the collar (11).

7. A method according to claim 6, characterized in that the angle θ lies in the range 30° to 60°.

8. A method of retaining a bearing (1) on the outside surface of a shaft (7), said bearing (1) comprising at least one inner ring (2) provided with an annular bore (6), an outer ring (3), and rolling bodies (4) disposed between said rings, said shaft (7) having an outside diameter that is substantially equal to the diameter of the bore (6), and at least one hollow annular axial projection (12), said method comprising the following steps:

disposing the shaft (7) coaxially in the bore (6) in the inner ring (2) so that at least an end portion of the projection (12) is disposed outside the bore (6); and forming a collar (11) on the projection (12) by implementing the method according to claim 1, said collar extending radially outwards while abutting against at least a portion of the lateral face (13) of the inner ring (2), said collar (11) forming retaining means for retaining the inner ring (2) of the bearing (1).

9. A method according to claim 8, characterized in that the angle α lies in the range of 0° to 20°.

10. A method according to claim 8, characterized in that, during deformation of the projection (12), an axial force is applied against the bearing (1) so as, in particular, to limit the stresses applied to the rings (2, 3) during this setup.

11. A method according to claim 8, characterized in that, during at least one step of forming the collar (11), the outer ring (3) is caused to rotate.

* * * * *